(12) United States Patent
Bhubhut

(10) Patent No.: US 11,886,560 B1
(45) Date of Patent: Jan. 30, 2024

(54) SYSTEM FOR VERIFYING A USER USING MIXED REALITY APPLICATIONS

(71) Applicant: Bottomline Technologies Ltd., Or Yehuda (IL)

(72) Inventor: Shay Bhubhut, Ramat Gan (IL)

(73) Assignee: Bottomline Technologies, Inc., Portsmouth, NH (US)

( * ) Notice: Subject to any disclaimer, the term of this patent is extended or adjusted under 35 U.S.C. 154(b) by 707 days.

(21) Appl. No.: 17/012,405

(22) Filed: Sep. 4, 2020

(51) Int. Cl.
| | | |
|---|---|---|
| G06F 21/32 | (2013.01) |
| G10L 17/00 | (2013.01) |
| G06Q 30/018 | (2023.01) |
| G06Q 10/067 | (2023.01) |
| G06Q 30/04 | (2012.01) |
| G06Q 20/38 | (2012.01) |
| G06Q 20/40 | (2012.01) |
| G06Q 10/10 | (2023.01) |
| G06V 40/30 | (2022.01) |
| G06V 40/70 | (2022.01) |
| G06F 18/22 | (2023.01) |

(52) U.S. Cl.
CPC ............ *G06F 21/32* (2013.01); *G06V 40/70* (2022.01); *G10L 17/00* (2013.01); *G06F 18/22* (2023.01); *G06Q 10/067* (2013.01); *G06Q 10/10* (2013.01); *G06Q 20/3825* (2013.01); *G06Q 20/40145* (2013.01); *G06Q 30/0185* (2013.01); *G06Q 30/04* (2013.01); *G06V 40/30* (2022.01)

(58) Field of Classification Search
CPC ......... G06F 21/32; G06F 18/22; G06V 40/70; G06V 40/30; G10L 17/00; G06Q 10/067; G06Q 10/10; G06Q 20/3825; G06Q 20/40145; G06Q 30/0185; G06Q 30/04
See application file for complete search history.

(56) References Cited

U.S. PATENT DOCUMENTS

| | | |
|---|---|---|
| 6,195,452 B1 | 2/2001 | Royer |
| 7,584,128 B2 | 9/2009 | Mason et al. |
| 8,538,124 B1 | 9/2013 | Harpel et al. |
| (Continued) | | |

OTHER PUBLICATIONS

Lue et al., FMCode: a 3D In-the-Air Finger Motion Based User Login Framework for Gesture Interface, 2018, https://arxiv.org/abs/1808.00130, pp. 1-17 (Year: 2018).*

*Primary Examiner* — John Van Bramer
(74) *Attorney, Agent, or Firm* — Downs Rachlin Martin PLLC

(57) ABSTRACT

Disclosed is a system and a method for verifying a user using reality applications. The system includes a database for storing plurality of modules, a server coupled to the database for processing the stored plurality of modules, a reality glasses having a camera to capture movements of the user, and a reality display coupled to the server to overlay virtual objects and the processed plurality of modules onto a field of view of the user, wherein the plurality of modules authenticates the user to access at least one of the virtual objects. The plurality of modules includes a biometric module performs a first level verification by performing biometric scans on the user, using the reality camera, a signature module performs a second level verification by verifying signature of the user drawn in air captured by the reality camera, and a signature motion flow module performs a third level verification by verifying flow of the user's signature captured by the reality camera.

15 Claims, 4 Drawing Sheets

(56) References Cited

U.S. PATENT DOCUMENTS

| | | | |
|---|---|---|---|
| 9,811,650 B2 | 11/2017 | Todeschini | |
| 10,540,491 B1 | 1/2020 | Martinez et al. | |
| 10,586,220 B2 | 3/2020 | Adams et al. | |
| 10,607,230 B2 | 3/2020 | Adams et al. | |
| 11,194,411 B1 * | 12/2021 | Douglas | G06F 21/32 |
| 2012/0200601 A1 * | 8/2012 | Osterhout | G02B 27/017 |
| | | | 345/633 |
| 2014/0337634 A1 * | 11/2014 | Starner | H04W 12/33 |
| | | | 713/186 |
| 2016/0226865 A1 * | 8/2016 | Chen | G06Q 20/321 |
| 2016/0342782 A1 * | 11/2016 | Mullins | G02B 27/0176 |
| 2017/0180336 A1 * | 6/2017 | Josephson | G06F 21/32 |
| 2020/0279275 A1 | 9/2020 | Kelly et al. | |

\* cited by examiner

SYSTEM FOR VERIFYING A USER USING MIXED REALITY APPLICATIONS

BACKGROUND OF THE INVENTIONS

1. Field of the Inventions

The present inventions generally relate to a system for verifying a user using mixed reality applications, and more particular relates to a system for verifying a user using multi-step authentication process in mixed reality environment.

2. Description of Related Art

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real.

Mixed reality (MR) is the merging of real and virtual worlds to produce new environments and visualizations, where physical and digital objects co-exist and interact in real time. The visual impressions of the real world are mixed with virtual information, e.g. by means of a semi-transmissive data display worn on the head of a user. The blending-in of virtual information or objects can be effected in context-dependent manner, i.e. matched to and derived from the respective environment viewed.

In many businesses, academic and other situations, a document must be passed between multiple users for review and comment. The documents may include project workflow documents, job applications, invoices, transaction documents, loan or financial account applications, insurance claim documents and the like. In many cases, these documents contain sensitive information, and it is desirable to limit the number of users who can access the sensitive data.

Further, due to spread of deadly viruses such as coronavirus, professionals are reluctant to touch any object such as document, pen, computer systems etc. Therefore, there is a need of a system for verifying a user using mixed reality. Further, the system should be able to create a multi-step authentication process before giving access of documents to the user in a mixed reality environment.

SUMMARY OF THE INVENTIONS

In accordance with teachings of the present inventions, a system for verifying a user using mixed reality is provided.

An object of the present inventions are to provide a system including a database for storing plurality of modules, a server coupled to the database for processing the stored plurality of modules, a reality glasses having a camera to capture movements of the user, and a reality display coupled to the server to overlay virtual objects and the processed plurality of modules onto a field of view of the user in real-time.

The plurality of modules includes a biometric module, a signature module and a signature motion flow module. The biometric module performs a first level verification by performing biometric scans on the user, using the reality camera. The signature module performs a second level verification by verifying signature of the user drawn in air captured by the reality camera. The signature motion flow module performs a third level verification by verifying flow of the user's signature captured by the reality camera.

Another object of the present inventions are to provide a microphone to capture audio signals of the user. Further, the plurality of modules includes a voice print module for performing a fourth level verification by verifying voice samples of the user captured by the microphone.

Another object of the present inventions are to provide the reality display displays documents. The server authenticates the user using the first level authentication, the second level authentication and the third level authentication to give access to the documents.

Another object of the present inventions are to provide the system wherein the biometric module scans retina of the user to perform the first level authentication. Further, the biometric module scans retina of the user to perform he first level authentication.

While a number of features are described herein with respect to embodiments of the inventions; features described with respect to a given embodiment also may be employed in connection with other embodiments. The following description and the annexed drawings set forth certain illustrative embodiments of the inventions. These embodiments are indicative, however, of but a few of the various ways in which the principles of the inventions may be employed. Other objects, advantages, and novel features according to aspects of the inventions will become apparent from the following detailed description when considered in conjunction with the drawings.

BRIEF DESCRIPTION OF DRAWINGS

The annexed drawings, which are not necessarily to scale, show various aspects of the inventions in which similar reference numerals are used to indicate the same or similar parts in the various views.

DETAILED DESCRIPTION OF DRAWINGS

Figure 1:
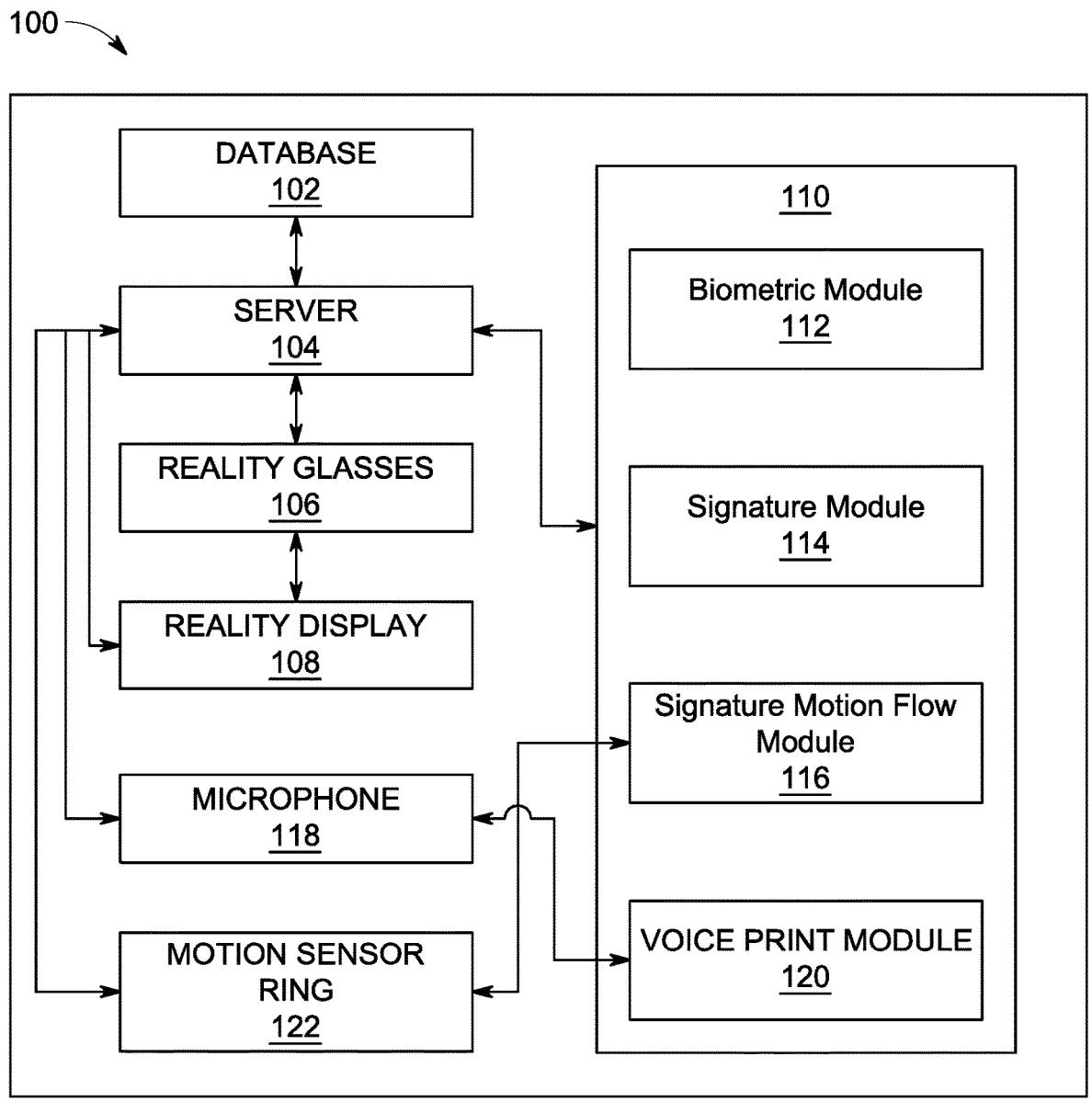
FIG. 1 illustrates a block diagram of a system for verifying a user using mixed reality in accordance with an embodiment of the present inventions.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

FIG. 1 illustrates a block diagram of a system 100 for verifying a user using reality applications in accordance with an embodiment of the present inventions. The system 100 includes a database 102, a server 104, a reality glasses having a camera 106, and a reality display 108. The database 102 stores plurality of modules 110. Examples of the database 102 include but not limited to a SQL Server, Oracle Database, Sybase, Informix, NoSQL, Elastic Search Database, MySQL etc. and other local and distributed databases.

The server 104 is coupled to the database 102 for processing the stored plurality of modules 110. Examples of the server 104 include but not limited to servers which provide various contents, a cloud server, a content providing server, and an application providing server. It would be readily apparent to those skilled in the art that various types of database 102 and the server 104 may be envisioned without deviating from the scope of the present inventions.

The reality glasses camera 106 capture movements of the user. The reality display 108 is coupled to the server 104 to overlay virtual objects and the processed plurality of modules 110 onto a field of view of the user in real-time. Examples of the reality glasses camera 106 include but not limited to augmented reality, mixed reality and virtual reality.

It would be readily apparent to those skilled in the art that various reality glasses 106 with one or multiple cameras to perform the working principle of system 100 may be envisioned without deviating from the scope of the present inventions. The plurality of modules 110 includes a biometric module 112, a signature module 114 and a signature motion flow module 116.

The biometric module 112 performs a first level verification by performing biometric scans on the user, using the reality camera. Examples of the biometric scan include but not limited to retina scan, fingerprint scan, biological mark scan, permanent mark scan etc. The server 104 verifies the biometric scan with pre-stored scan of the user to give access to at least one of virtual objects.

The signature module 114 performs a second level verification by verifying signature of the user drawn in air captured by the reality camera. The database 102 stores a verified signature to authenticate the user to give access. The server 104 verifies the received signature on receiving the signature from the signature module 114 to give access to at least one of the virtual objects.

The signature motion flow module 116 performs a third level verification by verifying flow of the user's signature captured by the reality camera. The database 102 stores user's flow of signature pattern and the server 104 verifies the flow of the signature pattern on receiving the signature motion flow received from the signature motion flow module 116 to give access to at least one of the virtual objects.

In another embodiment of the present inventions, the system further includes a microphone 118 to capture audio signals received from the user. Examples of the audio signals include not limited to a password, voice pattern, specific sound etc. Further, the plurality of modules 110 further includes a voice print module 120 for performing a fourth level verification by verifying audio signals of the user captured by the microphone.

The database 102 stores a verified audio signal and the server 104 verifies the captured audio signals received from the microphone 118 to give access to at least one of the virtual objects. Examples of the virtual objects include but not limited to a promissory note, invoices, wire transfers, other similar payment modes, documents, databases etc.

In another embodiment of the present inventions, the system 100 further includes a motion sensor ring 122 to monitor movements of a finger of the user. The motion sensor ring 122 is coupled to the signature motion flow module 116 for monitoring the flow of the signature. Examples of the motion sensor ring 122 include but not limited to accelerometers, gyros, inertial motion sensors, visual odometry sensors, etc.

Figure 2:
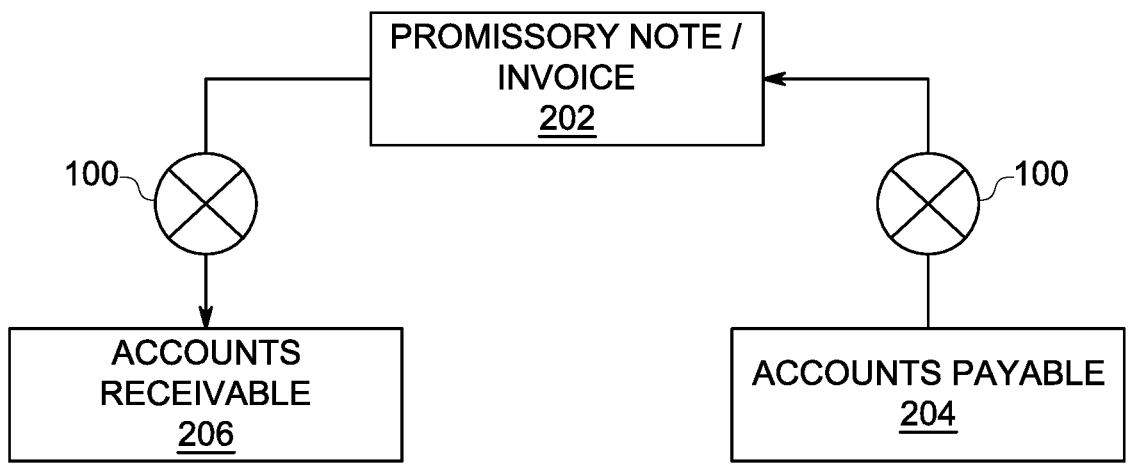
FIG. 2 illustrates a schematic diagram of plurality of modules in accordance with an embodiment of the present inventions.

FIG. 2 illustrates a block diagram of an exemplary embodiment showing usage of the system 100 for clearing payments. A promissory note or an invoice 202 is generated by accounts payable 204 to be receive by the accounts receivable 206. In order to maintain secure payments, the system 100 is incorporated into the payment process.

Thus, a user from account payable department 204 verifies themselves through the system 100 in order to release a promissory note/invoice 202. Similarly, before receiving payments, a user from the accounts receivable department 206 verifies themselves through the system 100. The system 100 ensures that an authenticated person is handling the payment process.

Figure 3:
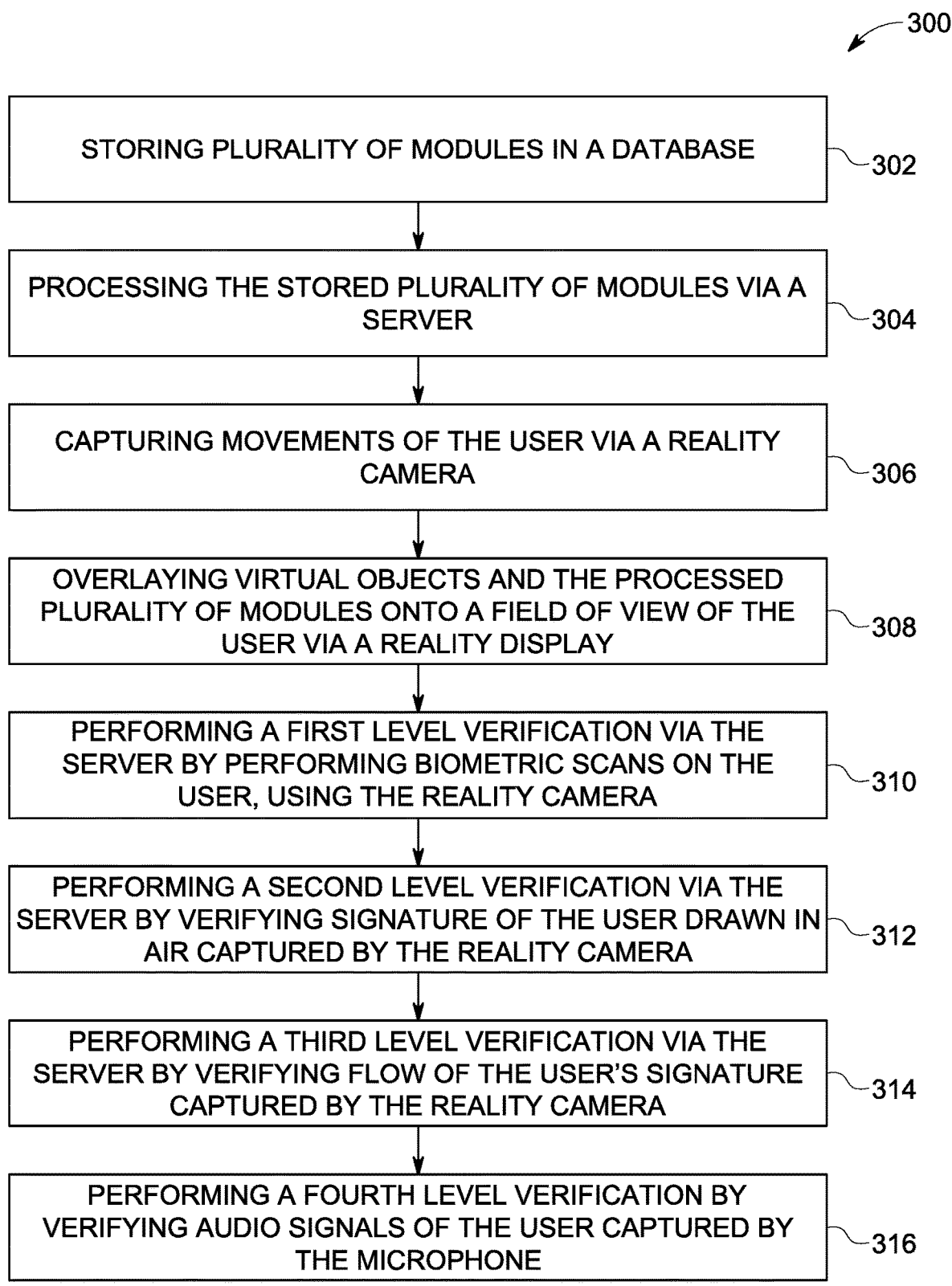
FIG. 3 illustrates a flowchart of a method for verifying a user using mixed reality in accordance with an embodiment of the present inventions, and FIG. 4 schematically depicts a reality display with server generated virtual objects in an exemplary embodiment of the present inventions.

FIG. 3 illustrates a flow chart of a method 300 for verifying a user using reality applications. The method 300 initiates with a step 302 of storing plurality of modules, followed by a step 304 of processing the stored plurality of modules via a server, followed by a step 306 of capturing movements of the user via a reality camera, followed by a step 308 of overlaying virtual objects and the processed plurality of modules onto a field of view of the user via a reality display.

Further, the step 308 is followed by a step 310 of performing a first level verification via the server by performing biometric scans on the user, using the reality camera, followed by a step 312 of performing a second level verification via the server by verifying signature of the user drawn in air captured by the reality camera, and finally followed by a step 314 of performing a third level verification via the server by verifying flow of the user's signature captured by the reality camera.

In another embodiment of the present inventions, the method 300 further includes a step of capturing audio signals received from the user via a microphone.

The step is then followed by a step 316 of performing a fourth level verification by verifying audio signals of the user captured by the microphone. The steps of method 300 is explained in detail in conjunction with elements described in FIG. 1 and FIG. 2 of the present invention.

In another embodiment of the present inventions, a non-transitory computer-readable storage medium that comprises instructions for verifying a user using reality applications on a graphical user-interface (GUI) of a reality display, which instructions, when executed by a processor, become operational to perform the method 300 is provided. The method 300 is explained in detail in conjunction with elements described in FIG. 1 and FIG. 2 of the present invention.

Figure 4:
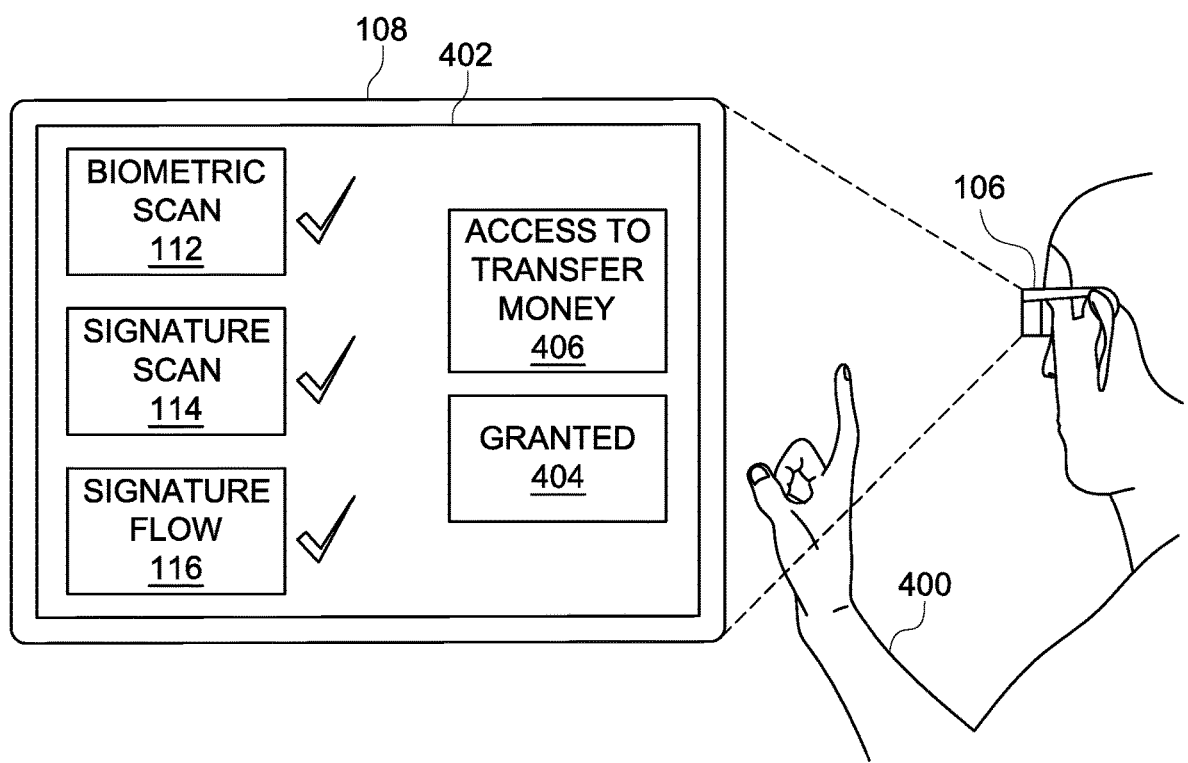

FIG. 4 schematically depicts a reality display 108 with server (104, as shown in FIG. 1) generated virtual objects 402 in an exemplary embodiment of the present inventions. The server (104, as shown in FIG. 1) authenticates the user 400 to provide access to transfer money 406.

When the server (104, as shown in FIG. 1) checks all required verifications such as biometric scan 112, signature scan 114 and signature flow 116. The server (104, as shown in FIG. 1) authenticates the user 400 by displaying a tick mark opposite to each scan. Thereafter, the server (104, as shown in FIG. 1) grants 404 access to the user to transfer money 406.

The present inventions allow the user 400 to wear a reality glasses 401 with the camera that capture movements of the user 400. The server (104, as shown in FIG. 1) then associated with the reality glasses 106 processes the images to authenticate the user 400 to grant access 404 to the virtual objects 402.

The present invention may involve machine/deep learning neural networks algorithms to determine the identity of the user. Each of the verification methods could use some form of machine learning to verify the user. For instance, the movement of the hand in the signature motion may be very precise in one person and have a wide variance on another. Machine learning may be used to determine the accuracy and precision of the movements of the hand to determine who is signing. In some cases, the machine learning algorithms return a confidence score rather than a binary match/ no match determination. The confidence scores from each verification, form the biometric scan 112, signature scan 114 and signature flow 116 could be combined and compared to an overall threshold to determine if there is a match with the user. In some embodiments, each of the verification forms (biometric scan 112, signature scan 114 and signature flow 116) could be checked against one threshold, and then the sum of the confidence scores could be checked against a second threshold as further verification of the confidence in the identity of the signer.

The present application offers various advantages such as the mixed reality application ensures the work is done paper less, no contact to pen or to a desktop/laptop and thus the entire process is contactless, which is the need of the hour during these COVID/pandemic times. The present application further restricts fraudulent transactions to avoid monetary loses to corporates.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A system for verifying a user using reality applications, the system comprising:
 a database for storing a plurality of modules;
 a server coupled to the database for processing the stored plurality of modules;
 reality glasses having a camera to capture movements of the user into images; and
 a reality display coupled to the server to overlay virtual objects and the processed plurality of modules onto a field of view of the user, wherein the plurality of modules authenticates the user to access at least one of the virtual objects, wherein the plurality of modules comprising:
  a biometric module performs a first level verification with biometric scans on the user from the images compared to stored biometric images;
  a signature module performs a second level verification with the signature of the user drawn in air captured in the images by the reality camera compared to a stored signature; and
  a signature motion flow module performs a third level verification with the flow of the user's signature captured in the images by the reality camera compared with a stored flow of the user's signature.

2. The system according to claim 1 further comprising a microphone to capture audio signals received from the user.

3. The system according to claim 2, wherein the plurality of modules further comprising a voice print module for performing a fourth level verification by verifying the audio signals of the user captured by the microphone.

4. The system according to claim 1 wherein the virtual object is a document, and the server authenticates the user using the first level verification, the second level verification, and the third level verification to give access to the document.

5. The system according to claim 1 wherein the biometric module scans a retina of the user to perform the first level verification.

6. The system according to claim 1 wherein the biometric module scans a fingerprint in the air of the user to perform the first level verification.

7. The system according to claim 1 further comprising a motion sensor ring to monitor movements of a finger of the user, further the motion sensor ring is coupled to the signature motion flow module for monitoring the flow of the signature.

8. A method for verifying a user using reality applications, the method comprising:
 storing a plurality of modules in a database;
 processing the stored plurality of modules via a server;
 capturing images of movements of the user via a reality camera;
 overlaying virtual objects and the processed plurality of modules onto a field of view of the user via a reality display;
 performing a first level verification via the server by performing biometric scans on the user, using the reality camera;
 performing a second level verification via the server by comparing the images of a signature of the user drawn in air captured by the reality camera with a stored signature; and performing a third level verification via the server by comparing a flow of the user's signature in the images captured by the reality camera with a stored flow of the signature.

9. The method according to claim 8 further comprising capturing audio signals received from the user via a microphone.

10. The method according to claim 9 further comprising performing a fourth level verification by verifying the audio signals of the user captured by the microphone.

11. The method according to claim 8, wherein the virtual object is a document.

12. A non-transitory computer-readable storage medium that comprises instructions for verifying a user using reality applications on a graphical user-interface (GUI) of a reality display, which instructions, when executed by a processor, become operational to:

store plurality of modules in a database;
processing the stored plurality of modules via a server;
capture images of movements of the user via a reality camera;
overlay virtual objects and the processed plurality of modules onto a field of view of the user via the reality display;
perform a first level verification via the server with biometric scans on the user from the images compared to stored biometric images;
perform a second level verification via the server with the images of a signature of the user drawn in air captured by the reality camera compared to a stored signature; and
perform a third level verification via the server with the images of a flow of the user's signature captured by the reality camera compared to a stored flow of the signature.

13. The non-transitory computer-readable storage medium according to claim 12 further comprises instructions to capture audio signals received from the user via a microphone.

14. The non-transitory computer-readable storage medium according to claim 13 further comprises instructions to perform a fourth level verification by verifying the audio signals of the user captured by the microphone.

15. The non-transitory computer-readable storage medium according to claim 12, wherein the virtual object is a document.

* * * * *